(12) United States Patent
Bittorf et al.

(10) Patent No.: US 11,267,094 B2
(45) Date of Patent: Mar. 8, 2022

(54) REDUCED-VIBRATION SURFACE TREATMENT DEVICE

(71) Applicant: Temple Allen Holdings LLC, Rockville, MD (US)

(72) Inventors: James H. Bittorf, Rockville, MD (US); Shane Brewer, Bethesda, MD (US)

(73) Assignee: TEMPLE ALLEN HOLDINGS LLC, Rockville, MD (US)

( * ) Notice: Subject to any disclaimer, the term of this patent is extended or adjusted under 35 U.S.C. 154(b) by 250 days.

(21) Appl. No.: 15/110,446

(22) PCT Filed: Jan. 14, 2015

(86) PCT No.: PCT/US2015/011349
§ 371 (c)(1),
(2) Date: Jul. 8, 2016

(87) PCT Pub. No.: WO2015/108936
PCT Pub. Date: Jul. 23, 2015

(65) Prior Publication Data
US 2016/0325392 A1    Nov. 10, 2016

Related U.S. Application Data

(60) Provisional application No. 61/927,175, filed on Jan. 14, 2014.

(51) Int. Cl.
| | | |
|---|---|---|
| *B24B 7/18* | (2006.01) | |
| *F16F 1/36* | (2006.01) | |
| *B25F 5/00* | (2006.01) | |
| *B24B 55/00* | (2006.01) | |
| *B25G 1/01* | (2006.01) | |
| *B24B 27/00* | (2006.01) | |

(Continued)

(52) U.S. Cl.
CPC .............. *B24B 7/184* (2013.01); *B24B 7/186* (2013.01); *B24B 27/0076* (2013.01); *B24B 41/007* (2013.01); *B24B 55/00* (2013.01); *B24B 55/02* (2013.01); *B25F 5/006* (2013.01); *B25G 1/01* (2013.01); *F16F 1/36* (2013.01)

(58) Field of Classification Search
CPC .......... B24B 7/184; B24B 55/00; B25F 5/006
USPC ...................................... 173/162.2
See application file for complete search history.

(56) References Cited

U.S. PATENT DOCUMENTS 4,060,138 A * 11/1977 Cox ..................... B25D 17/043
173/49
4,232,980 A * 11/1980 Tertinek ................ E04F 21/248
192/129 R (Continued)

FOREIGN PATENT DOCUMENTS

DE   10 2004 062443   7/2006
WO      03/097939    11/2003

OTHER PUBLICATIONS

J. E. Mark, Rubber Elasticity, Nov. 1981, p. 900 (Year: 1981).*

*Primary Examiner* — Valentin Neacsu
*Assistant Examiner* — Jacob A Smith
(74) *Attorney, Agent, or Firm* — Clark & Brody LP (57) ABSTRACT

A vibration-reducing component and an apparatus for its use. The vibration-reducing component combines an elastic member with a compression element to both resist applied forces and absorb selected vibrations. The vibration reducing component finds particular utility in tools that inherently create vibrations.

17 Claims, 8 Drawing Sheets

(51) Int. Cl.
*B24B 41/00* (2006.01)
*B24B 55/02* (2006.01)

(56) References Cited

U.S. PATENT DOCUMENTS

| | | | | | |
|---|---|---|---|---|---|
| 5,157,807 | A | * | 10/1992 | Keller | B25D 17/043 16/431 |
| 5,269,381 | A | * | 12/1993 | Oscarsson | B25D 17/24 173/162.2 |
| 5,657,674 | A | * | 8/1997 | Burnett | B25D 1/12 81/20 |
| 6,321,890 | B1 | * | 11/2001 | Suzuki | F16F 7/108 188/379 |
| 6,655,667 | B1 | * | 12/2003 | Hamaekers | F16F 13/105 267/140.13 |
| 7,270,320 | B2 | | 9/2007 | Menzel | F16F 1/125 267/175 |
| 7,708,260 | B2 | * | 5/2010 | Eicher | B25F 5/026 267/207 |
| 8,038,513 | B2 | * | 10/2011 | Roehm | B25F 5/006 451/354 |
| 8,210,276 | B2 | * | 7/2012 | Krondorfer | B24B 23/02 173/162.2 |
| 8,567,520 | B2 | * | 10/2013 | Wolf | B27B 17/0033 173/162.2 |
| 8,914,947 | B2 | * | 12/2014 | Weiss | B25D 17/043 16/431 |
| 2002/0104665 | A1 | * | 8/2002 | Wolf | B25F 5/006 173/162.2 |
| 2004/0231867 | A1 | * | 11/2004 | Becht | B25D 17/043 173/162.2 |
| 2005/0169707 | A1 | * | 8/2005 | Lutz | E04G 21/066 404/114 |
| 2008/0078041 | A1 | * | 4/2008 | Mitchel | A47L 11/4069 15/50.3 |
| 2008/0148525 | A1 | * | 6/2008 | Krondorfer | B24B 23/02 16/436 |
| 2008/0223593 | A1 | * | 9/2008 | Eicher | B25F 5/006 173/162.2 |
| 2009/0039576 | A1 | * | 2/2009 | Eicher | B25F 5/026 267/137 |
| 2009/0188692 | A1 | * | 7/2009 | Hahn | B25D 17/24 173/210 |
| 2011/0017483 | A1 | * | 1/2011 | Baumann | B25D 17/24 173/162.2 |
| 2011/0073339 | A1 | * | 3/2011 | Werner | B25D 17/06 173/162.2 |
| 2011/0211910 | A1 | | 9/2011 | Argento et al. | |
| 2012/0211250 | A1 | * | 8/2012 | Yamauchi | B25F 5/026 173/162.2 |
| 2013/0331016 | A1 | * | 12/2013 | Kimoto | B24D 7/066 451/548 |
| 2015/0027745 | A1 | * | 1/2015 | Kurzenberger | B25F 5/006 173/162.2 |
| 2016/0008892 | A1 | * | 1/2016 | Haimer | B23B 31/1179 279/102 |
| 2018/0051472 | A1 | * | 2/2018 | Grinwald | B25F 5/006 |
| 2019/0131835 | A1 | * | 5/2019 | Horng | H02K 1/28 |

\* cited by examiner

REDUCED-VIBRATION SURFACE TREATMENT DEVICE

TECHNICAL FIELD

This invention relates to the art of vibration reduction and, in particular, to reduction of vibration in devices used for treating surfaces.

BACKGROUND ART

Devices are known that are designed to treat surfaces. An orbital sander is one example of a device that is used for treating surfaces, such as floors, walls, ceilings, decks, and the like. Known surface treatment devices can comprise a source of rotary motion, such as an electric or pneumatic motor, and a disk connected to the source of rotary motion for holding a treatment element. The treatment element can be sandpaper or a polishing pad, which rotates with the disk. The source of rotary motion is typically held in a structure that includes a handle that can be engaged by a user to guide the disk over the surface to be treated. In the case of sanding or polishing, the operator uses the handle to guide the disk over the surface while it is rotating to sand or polish the surface.

Examples of surfaces that may require treatment are those surfaces of an aircraft, either during construction or refurbishing. For example, the top side of an aircraft wing. When refurbishing an aircraft is it common to sand the surfaces to remove old paint to prepare them for repainting. In prior methods of treating aircraft surfaces, workers would treat the surfaces while standing, or kneeling on their hands and knees, in the case of horizontal surfaces. Treating the upper surface of a wing and a wide variety of other surfaces lends itself to the use of a device similar to a floor sander.

A problem encountered with surface treatment devices is that of operator fatigue. A major factor in such fatigue is the transmission of vibrations through a handle to the operator. The vibrations originate from many sources, primary ones being the source of power as well as interactions between the disk and the surface being treated. Because the vibrations are essentially continuous during operation of the device, they can cause serious injuries if not limited in magnitude and duration. With respect to the duration of exposure to the vibrations, many governmental authorities restrict the number of hours per day that an operator can operate vibrating devices.

Accordingly, one object of this invention is to improve the overall ergonomic factors associated with devices that treat surfaces.

Another object is to reduce the magnitude of the vibrations by providing a structure that greatly reduces the vibrations transmitted to the operator, thus reducing injury.

Additional objectives of the invention are to provide a device for surface treating that provides better operator control, is balanced for easier carrying, and permits the use of different types of surface treatment tools.

SUMMARY OF THE INVENTION

In accordance with the invention a device is provided that finds particular utility in the treatment of a variety of types of surfaces, including but not limited to the upper surfaces of aircraft, boats, and similar vehicles as well as floors. Surfaces for which one embodiment of the invention finds particular utility are those generally horizontal surfaces on which an operator stands while moving the device over the surface. It will be apparent to those of skill in the art, however, that the device to be described may find utility in treating other surfaces and that the principles of vibration reduction and the related components described can be applied to other devices.

The device of the invention generally includes a bracket configured to attach an effector, which can be one or more orbital sanders, grinders, buffers, etc., a handle connected to the bracket by a vibration-reducing component, and a cross-bar that can be gripped by a user to control operation of the device.

While vibration is reduced by the combination of parts to be described and their arrangement, the vibration-reducing component is important to the absorption of vibrations transmitted through the handle to the user. The vibration-reducing component is capable of absorbing vibrations including but not limited to those generated by an orbital sander. The vibration-reducing component may include two members that provide different properties, such as elastic and compressive. These members may, for example, be arranged with the compressible elastic member at the center, (e.g. at the core), but the compressible elastic member need not necessarily be located in the center of the component. That is, the two members can be arranged in a coaxial manner with the compressible elastic member at the center or on the outside, or they can be combined in a non-coaxial manner. The compressible elastic member may be tubular and may have a cross section that is circular, rectangular, hexagonal, or of other shapes, including more than one cross sectional shape in a single core element. In addition it may be solid and have one or more selected cross sections. The compressible elastic member optionally includes a flange at each respective end to facilitate connection to other elements, and other connection elements may, as well, be used. In embodiments where the compressible elastic member element is the terminus of a handle no connection element may be necessary.

In one embodiment, one end of the vibration-reducing component can be attached directly to the bracket, as by bolts or other connecting elements, and the opposite end can be connected to the handle through a bearing that allows the effector to rotate through an angle that permits the effector to assume automatically an effective orientation with respect to the surface undergoing treatment. In some embodiments, the rotational axis of the bearing is aligned with the longitudinal axis of the handle, but in other embodiments, the two axes are offset. Thus, the effector can be mounted to a handle or other control element with several degrees of freedom.

In an embodiment the compressible elastic member is made of polyurethane, but other materials having appropriate stiffness and vibration absorbing qualities are within the scope of the invention. For example, the compressible elastic member can be a spring, such as a coiled compression spring or a spring made of a resilient material having spring-like properties. As used herein, spring or elastic refers to the property of a material or an element whereby it returns to its original length or shape after being stretched or deformed. In one embodiment, the compressible elastic member is of polyurethane about six inches in length but may be of other lengths, including lengths in the range of from 7.5 to 4.8 inches. The outer diameter is about 1.75 inch but may be in the range of from 2.1 to 1.4 inches, and the inner diameter is about 1.00 inches but may be in the range of from 1.2 to 0.08 inches. In an embodiment, the stiffness of the compressible elastic member is Durometer 95A, but materials of other stiffness may be acceptable. Moreover, the compressible elastic member may be scaled up or down to be longer or shorter, by maintaining the general proportion provided by these dimensions.

To adjust the various characteristics of the vibration-reducing component it is further provided with compression elements that apply compressive forces to the compressible elastic member. Changing the characteristics of the compressible elastic member can provide increased control of the effector by the operator and can adjust the vibration absorbing properties of the overall vibration-reducing component. Thus, compressing the compressible elastic member element will increase the force required to compress it further, making it stronger in the direction of the compression whereby it can support the elements of the device (e.g., the handle) and resist greater forces applied by the user. Additionally, however, this compression changes the ability of the compressible elastic member to absorb vibrations, thus tuning the compressible elastic member to absorb desired frequencies. This selection of the physical properties of the compressible elastic member and the compression allows the vibration-reducing component to be tuned to absorb desired high frequencies. In one embodiment the compression elements comprise two galvanized steel cables attached to the flanges on diametrically opposite sides of the compressible elastic member, but other materials may be found advantageous. In this embodiment the cables are parallel to the longitudinal axis of the compressible elastic member and the vibration-reducing component is attached to the bracket and the handle such that the cables lie in a vertical plane. This orientation provides increased stiffness to the compressible elastic member in the vertical plane to reduce flexure of the vibration-reducing component due to the weight of the handle and the forces applied by the operator. It is within the contemplation of the invention, however, that the compression elements can have other arrangements and do not have to be parallel to each other or parallel to an axis of the handle. As alternative examples, the compression element could be helical, and groups of linear compression elements can lie in multiple planes and in planes other than vertical. It will be appreciated that the cables may provide compression of the compressible elastic member that is not uniform. Moreover, "cables" as used herein encompasses a variety of compression elements in addition to rope-like devices.

It is also within the concept of the invention to use a plurality of vibration-reducing components attached together, either in serial fashion or in parallel, or combinations thereof. These combinations need not form a linear structure but can be curved. For example, the vibration-reducing component, or combinations thereof can be curved at the distal end adjacent the effectors, midway between the effectors and the operator, or at an end engaged by an operator.

In specific embodiments described herein the effectors (tools) are pneumatically driven, with either positive or negative pressures. This allows the device to be used safely in environments having explosive or flammable factors. However, it is within the contemplation of the invention that other power sources could be used, including electric, magnetic, hydraulic, as well as others.

The device described can also be provided with a fluid reservoir to provide fluid to the surface treated as well as a vacuum to withdraw dust or the like.

DETAILED DESCRIPTION OF SPECIFIC EMBODIMENTS

Figure 1:
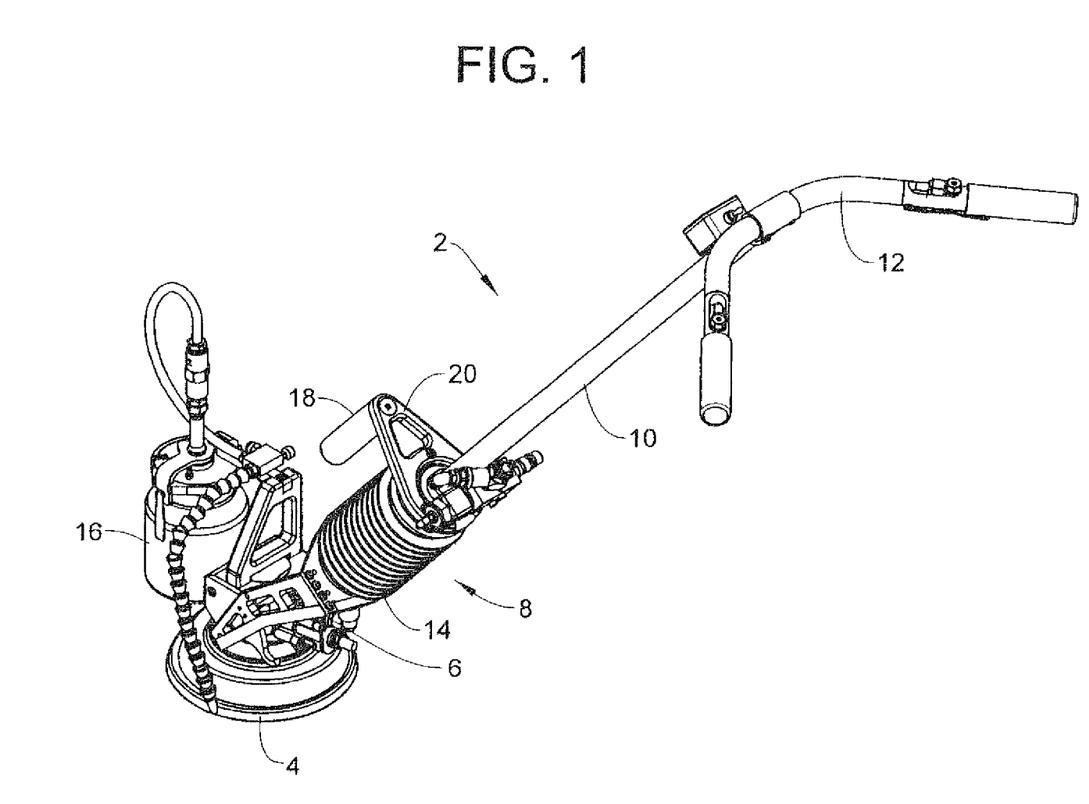
FIG. 1 is a perspective of a reduced vibration surface treatment device in accordance with the invention.

FIG. 1 illustrates a first embodiment of a device 2 useful for treating surfaces. The device includes an effector 4 at one end, the effector being the primary device that engages the surface to be treated. The effector 4 is attached to a bracket 6 by a pivoting connection that allows the effector to rotate about an axis transverse to the axis of the handle. A vibration-reducing component 8 is connected at one end to the bracket 6 and at its opposite end to a handle 10, which is in turn connected to a crossbar 12.

In one embodiment, the effector is one or more orbital sanders as illustrated in the figures, but it can be other articles as discussed above, such as grinders, buffers, polishers, etc. The connection between the effector 4 and the bracket 6 may be of several known types, including cylindrical pins located on opposite sides of the effector, the pins being pivotally received in bearings or bushings in the bracket. The bracket 6 illustrated in FIG. 1 is in the form of a yoke that engages opposite sides of the effector 6, but it can also take different forms, depending on the particular effector, such as a central shaft with a single bushing that engages a single pin centrally located on the effector.

Figure 3:
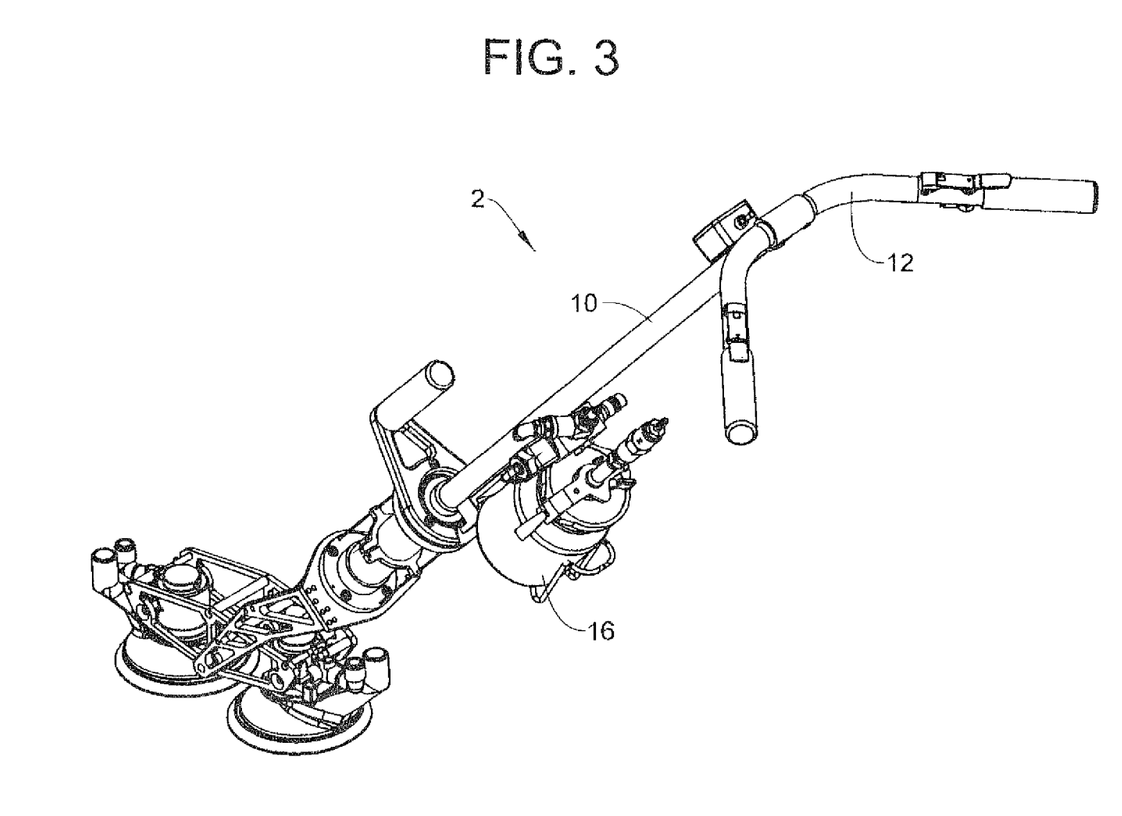
FIG. 3 is a perspective showing a third embodiment of a reduced vibration surface treatment device in accordance with the invention.

FIG. 1 also illustrates a fluid reservoir 16 that provides a fluid, such as water, to the effector 4 when such is desirable for the particular treatment. An example of such a treatment is that of wet-sanding the surface. In the embodiment of FIG. 1, the fluid reservoir is mounted on the front of the effector, while in FIG. 3 it is mounted on the handle 10. The particular position of the fluid reservoir is determined according to the characteristics of the particular effector in use, but the location shown in FIG. 3 is advantageous because it improves balance of the various parts of the overall device 2. For example, a carrying handle 18 is provided to facilitate moving the device. When the fluid reservoir is located forward of the effector, as in FIG. 1, the handle is oriented to provide a hand grip to the user that is more forward, because the forward location of the fluid reservoir will move the center of gravity of the device forward. When the fluid reservoir is moved rearward, as in FIG. 3, the carrying handle 3 is turned around so that it extends more rearward to accommodate the more rearward location of the center of gravity. It will be appreciated that the carrying handle may be located in any location that assists in carrying the device, the particular location depending on the particular configuration of the device. The carrying handle can be mounted to a handle bracket 20, which is in this embodiment attached to an upper part of the vibration-reducing component 8, but it may be attached to the handle 10. The carrying handle 18 illustrated is attached to the handle bracket by engagement between a threaded shaft on the handle and a threaded opening on the bracket, which allows easy re-orientation of the handle between the respective positions shown in FIGS. 1 and 3. Other methods of connection will be apparent to those of skill in the art.

The fluid reservoir can be attached to the handle 10 in FIG. 3 by any known manner for attaching an article to a shaft, one example being a bracket with a cylindrical cavity at its base that is shaped to receive the bottom portion of the reservoir, and a releasable strap that engages an upper portion of the side of the reservoir to hold it in the bracket.

Figure 2:
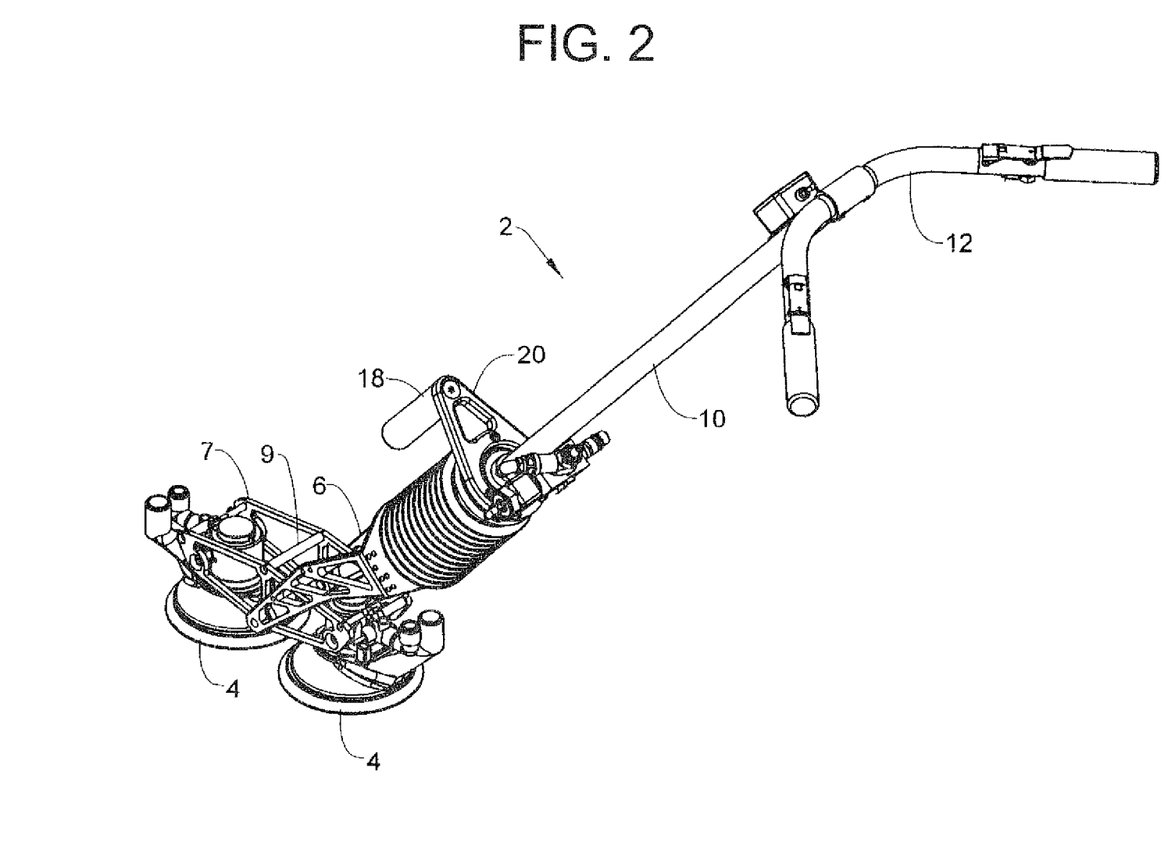
FIG. 2 is a perspective of a second embodiment of a reduced vibration surface treatment device in accordance with the invention.

FIG. 2 illustrates an embodiment having two effectors. These effectors are carried by a second bracket 7, the effectors being mounted to each end of the bracket 7 by respective pivotal connections that permit rotation about respective axes. The bracket 7 attached to the bracket 6 by a further pivotal connection. Also, the bracket 7 includes a mounting bar 9 that can support the fluid reservoir 16, if desired.

Figure 4:
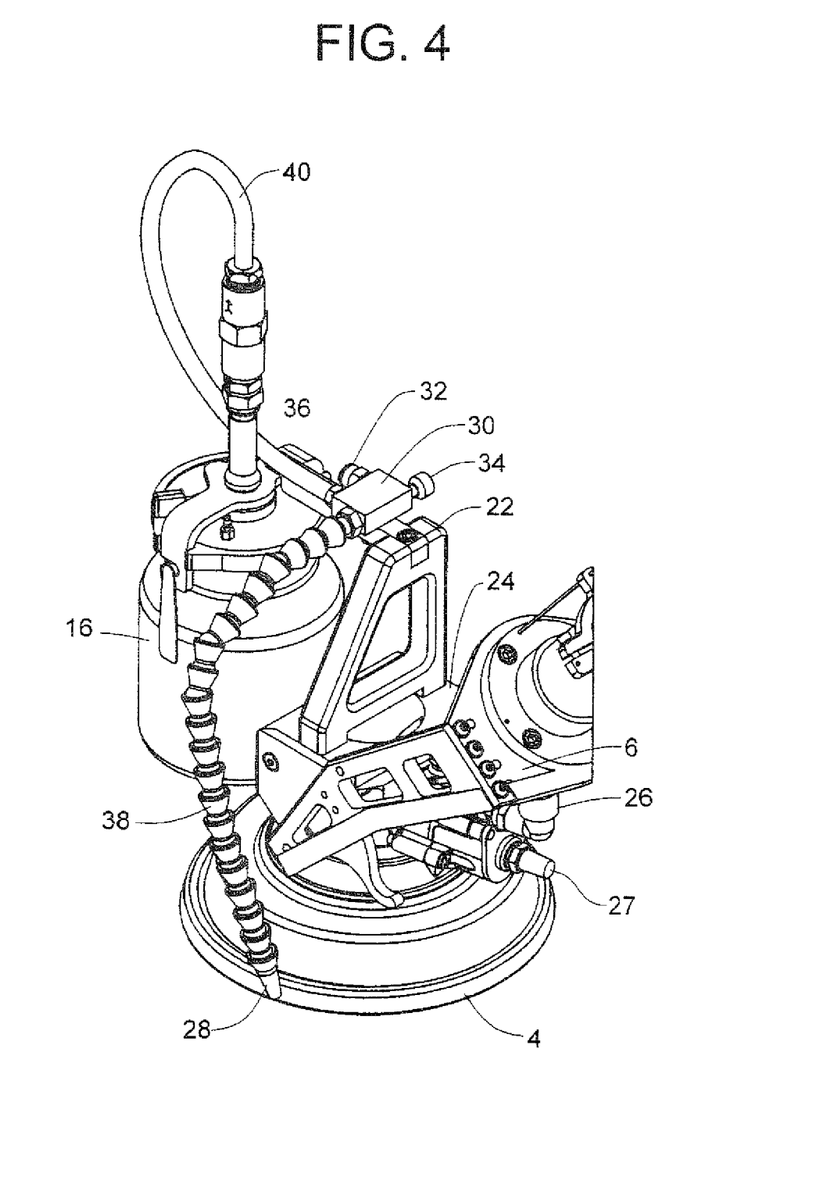
FIG. 4 is a perspective of the lower part of the device shown in FIG. 1.

With reference to FIG. 4, the lower part of the device shown in FIG. 1 is illustrated. The reservoir 16 shown here is supported by a mounting bracket 22 that is attached to the top of the effector housing 24. Thus, bracket 22 mounts the reservoir forward of the effector as described above. The effector includes a pneumatic inlet 26 for driving the effector during operation. An exhaust muffler 27 exhausts air from the effector. Fluid from reservoir 16 can be provided to the surface being treated through a fluid dispensing nozzle 28. Fluid is drawn from the reservoir 16 through the use of a valve 30. Valve 30 includes an air inlet 32 which receives air as described in connection with FIG. 5*a*. A manual control knob 34 allows the user to adjust the flow rate through valve 30 and the fluid mixture. When air is caused to flow into inlet 32 by opening control valve 48, fluid or a mixture of fluid and air flows through outlet 36 and hose 38 to nozzle 28. Fluid flows from the reservoir 16 to the valve 30 through hose 40.

A similar arrangement is used to provide fluid in the embodiment of FIG. 3.

Figure 5:
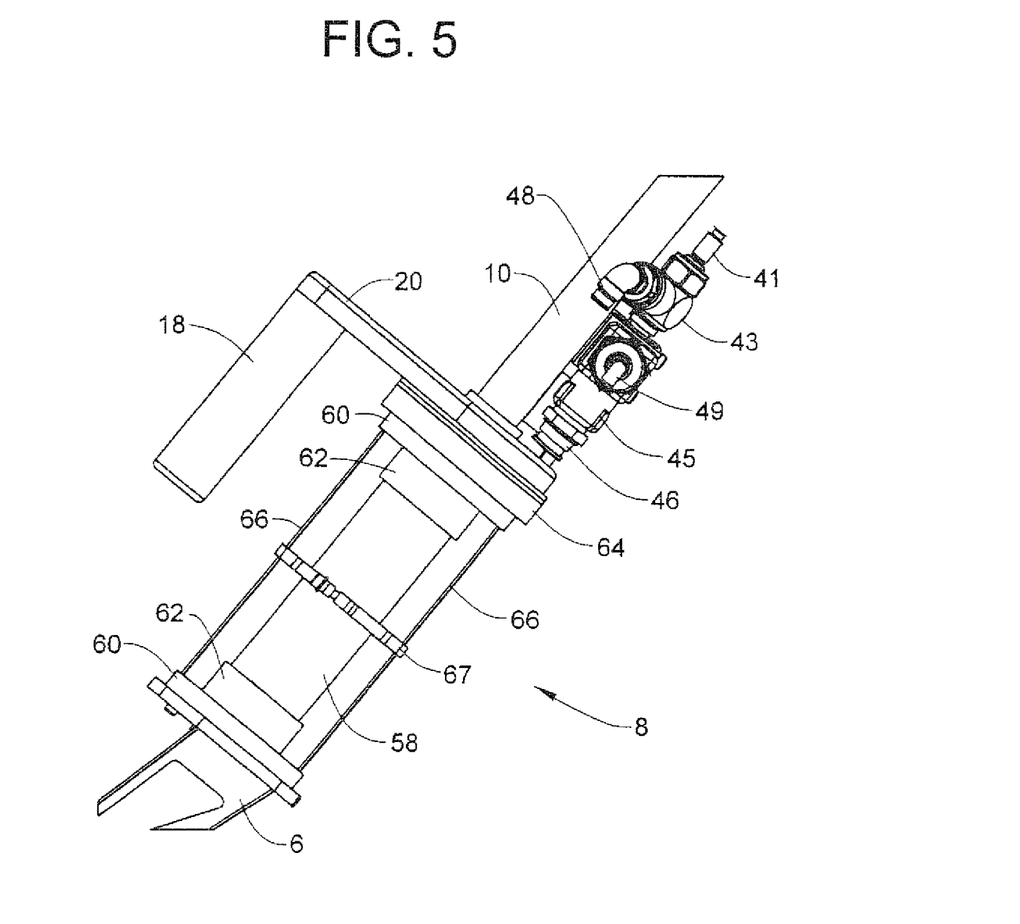
FIG. 5 is a side view of the vibration-reducing component of the device.
Figure 5A:
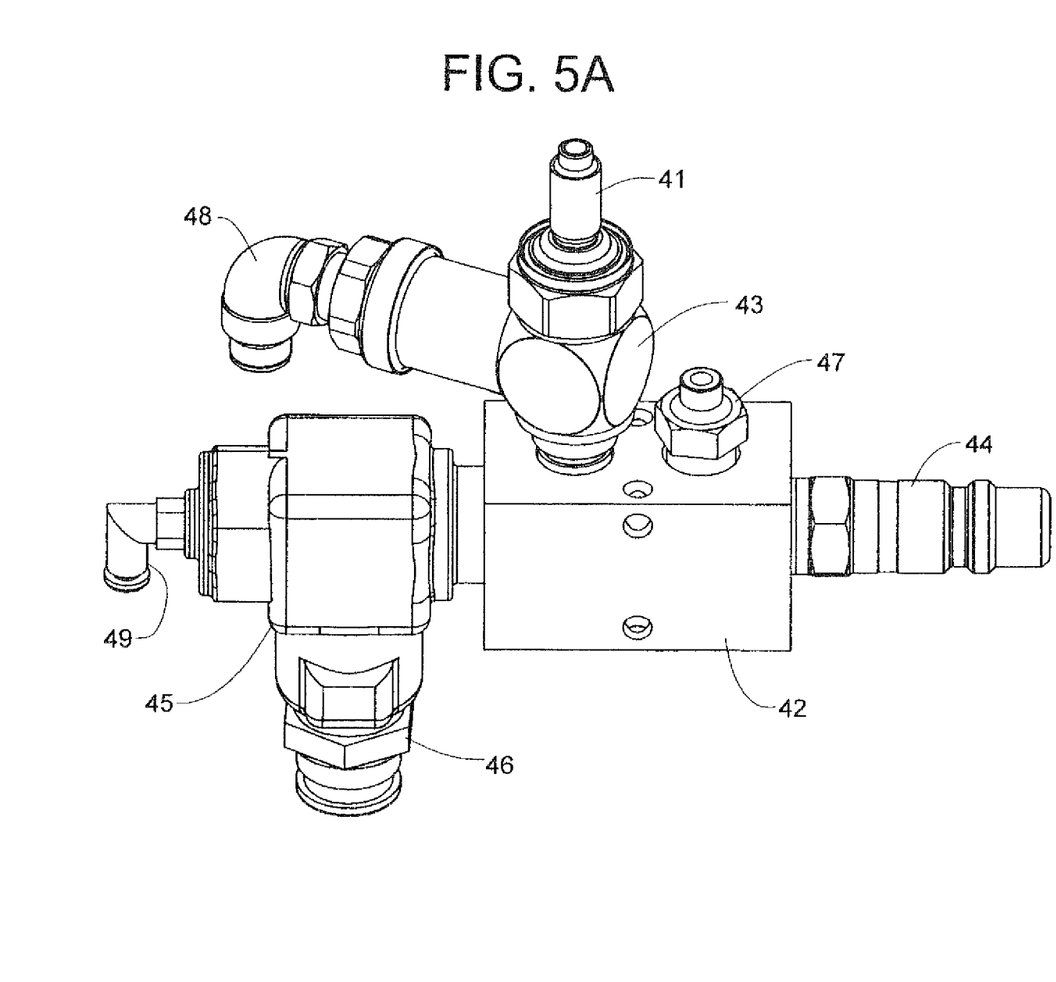
FIG. 5a shows an embodiment of a manifold of the device of FIG. 5.

FIGS. 5 and 5*a* illustrate the structure for controlling pneumatic flows to the fluid reservoir and the effectors. A manifold 42 is mounted to the handle 10. The manifold 42 receives air from a source (not shown) through inlet 44. The manifold includes outlet 46 to supply air to the effectors and outlet 48 to supply air to valve 30 on the fluid reservoir. Outlet 47 provides air to the main switch 50 as described below. The control structure further includes a first blocking valve 45 interposed between the manifold 42 and the outlet 46. The first blocking valve is controlled by air input to a pilot 49, which receives air from a valve 52, as described below. A second blocking valve 43 is interposed between the manifold 42 and the outlet 48. The second blocking valve is controlled by air inputs to the second pilot 41, which receives air from a valve 52. The outlet 46 is preferably connected to respective inlets of one or more effectors, such as the inlet 26, or inlets on the two effectors shown in FIG. 2. As well, an outlet 48 is connected to the inlet 32 of valve 30 to control delivery of fluid from the reservoir 16.

The operator regulates the flow of air to the control valves in the following manner. First a main switch 50 (see FIG. 6), which is illustrated as attached to the handle near the cross bar 12, but it can be anywhere accessible to the operator. The main switch 50 receives air from the manifold 42 from outlet 47 and has an outlet tube 56 connected to each of the valves 52 mounted on the crossbar. The valves are in turn controlled by the illustrated levers 54, which are easily assessable to the operator during use of the device. In the embodiment shown, the levers 54 can be manipulated by gripping by the operator. When the main switch 50 is activated, air is supplied to the valves 52, and pressing on a lever 54 causes air to flow to a blocking valve through tube 56 (if a dual lumen tube) or a second tube 56', which allows air to flow through an appropriate outlet of the manifold 42 to an effector or to the valve 30, as the case may be. Thus, the operator can control the effector and the flow of fluid by operation of respective ones of the levers 54.

Mechanisms other than the levers 54 may be used for controlling the valves 52. For example, the invention also contemplates the use of triggers, buttons, or other such elements known in the art.

With reference to FIG. 5, the vibration-reducing component 8 comprises a compressible elastic member 58. The compressible elastic member 58 is made of an elastomeric material, such as polyurethane, but can comprise different materials or combinations of different materials. The compressible elastic member 58 may have a flange 60 at each end to facilitate attachment to other elements, the compressible elastic member being received in mounting cups 62 secured to the flanges. In this embodiment, the lower flange is shown connected to the bracket 6, and the upper flange is connected to a mounting plate 64.

The vibration-reducing component further includes compression elements that place the compressible elastic member 58 in compression. In the embodiment illustrated the compression elements are cables 66 that are attached at opposite ends to the two flanges 60. These cables are illustrated in this embodiment as being parallel, but they may take other orientations and need not be linear. In one embodiment, the cables 66 are made of galvanized steel, and lie in a vertical plane. When tightened to a desired degree of tension the cables place the compressible elastic member 58 in compression and provide additional stiffness to the compressible elastic member 58 primarily in the vertical plane. This construction allows the compressible elastic member to be flexible enough to absorb vibrations while also being stiff enough in the vertical plane to allow control by the operator and to support the weight of the handle at least partially.

Additional compression elements can be used at other orientations or elements 66 can be used in other orientations to adjust the compression to absorb other vibrations or to provide stiffness in additional planes, depending on the vibrations generated by the effectors and the geometry of the particular device. For example, it has been found that most of the vibrations to be absorbed are transverse, but many are compression, and the spectrum of frequencies of the vibrations varies. The particular stiffness of the compressible elastic member and the compressions provided by the cables can be adjusted to maximize absorption of different types of vibrations. (As noted above, "cable" includes other compressions elements also.)

The vibration-reducing component also includes a support element 67, which engages the cables between their opposite ends. The particular location, diameter, connection to the cables of this support element will depend on the particular vibrations to be absorbed and other forces to be applied to the component.

Figure 7:
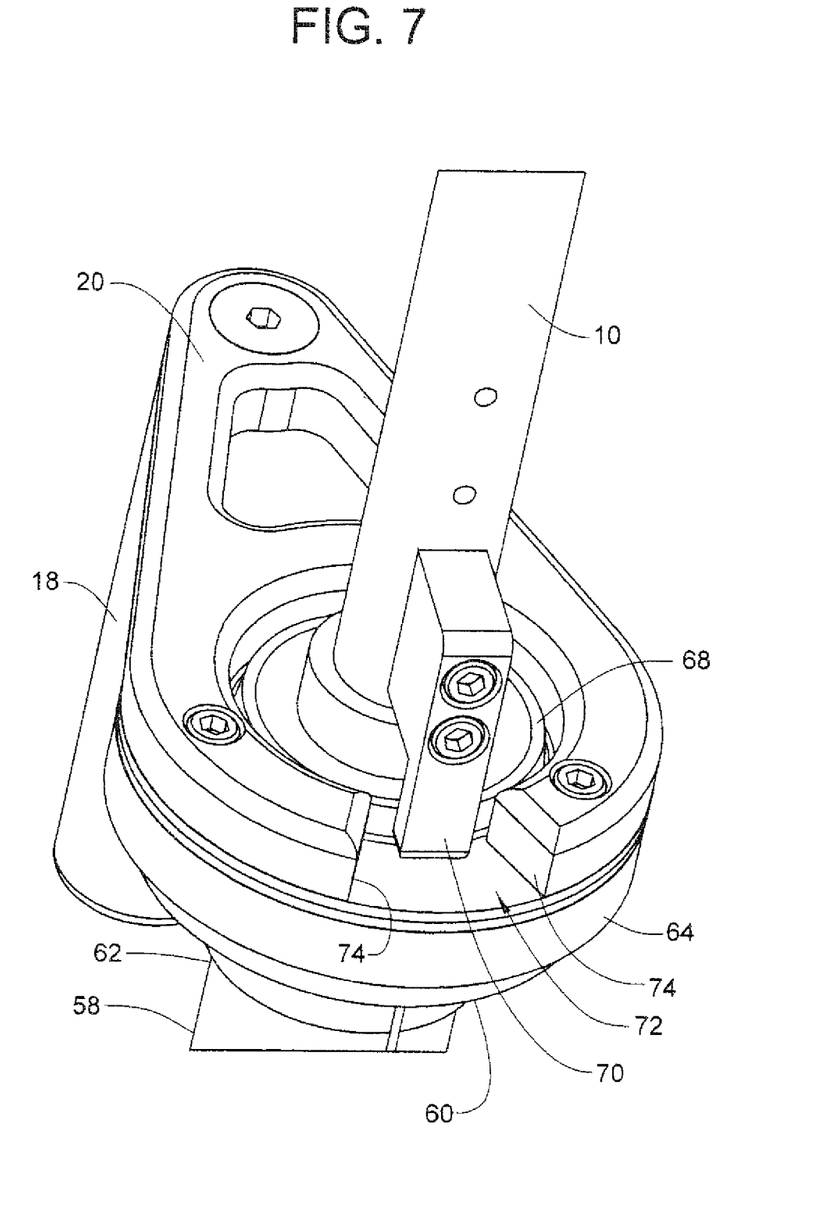
FIG. 7 is a perspective showing the attachment of the vibration-reducing component to the handle in a reduced vibration surface treatment device in accordance with an embodiment of the invention.

The mounting plate 64 supports a bracket 20 and includes a centrally located bearing 68. The handle 10 is mounted to one part of the bearing to allow rotation of the handle with respect to the vibration-reducing component and the effectors. This allows the effectors to orient themselves automatically with respect to the orientation of the crossbar 12, which assists in maintaining the proper orientation of the effectors with respect to the surface being treated. On the other hand, it is also advantageous for the operator to have some control over the orientation of the effectors, and this is accomplished in the embodiment described by a stop 70 that is attached to the handle 10 for movement in a slot 72 in the bracket 20. This arrangement allows the vibration-reducing component to rotate with respect to the handle by an angular extent defined by the ends 74 of the slot. When the operator rotates the crossbar through an angle that causes the stop to engage one of the ends 74, further rotation of the crossbar will rotate the vibration-reducing component and the effectors. This allows the operator to tip the effectors on their edges when treatment of the surface so requires.

Figure 6:
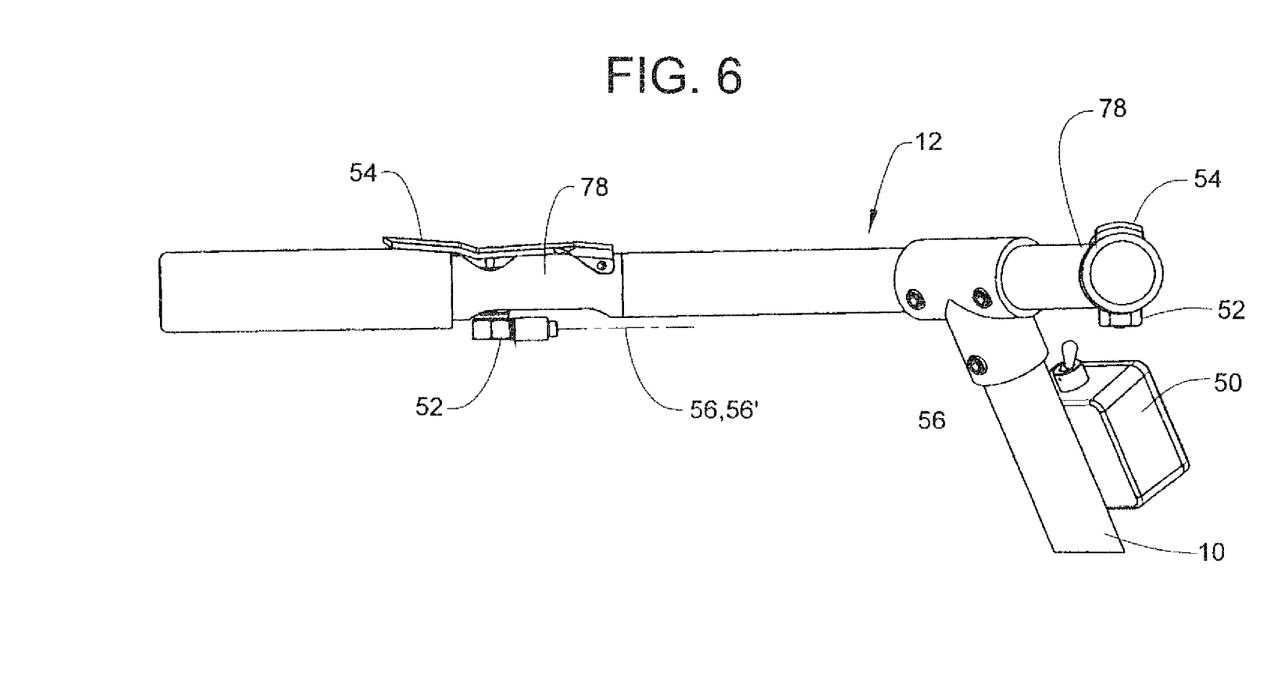
FIG. 6 is a side view of the crossbar portion of the device.

The handle can be made of solid aluminum, but other constructions may be found useful depending on the vibrations to be absorbed. In the embodiment illustrated the crossbar comprises a central section 76 of hollow stainless steel and end portions 78 of solid aluminum. In alternate embodiments, the handle and the crossbar can be constructed of a plurality of vibration-reducing components as described arranged to form a handle or a crossbar solely of these components or as a plurality of these components combined with intervening tubes or other structures.

It is also within the scope of the invention to eliminate the crossbar altogether and to provide the described controls on a proximal end of a handle whereby the operator grasps the handle in much the same manner as one would a broomstick. Alternatively, the proximal end of the handle can be curved to provide a type of crossbar to facilitate engagement by the operator. The handle may also be of almost any length, depending on the particular manner in which the device is to be used.

It will be appreciated that a unique vibration-reducing component and device for its use have been described. The vibration-reducing component is advantageous because it provides in an integrated component both structural and vibration-reducing features. The spacing and placement of the compression elements and the forces applied can be varied to accomplish vibration-reduction as well as to resist forces in desired directions.

Modifications within the scope of the appended claims will be apparent to those of skill in the art.

We claim:

1. A vibration-reducing component comprising a compressible elastic member and a plurality of individual compression elements, wherein each of said individual compression elements is connected to said compressible elastic member at first and second locations of said compressible elastic member spaced in the direction of an elastic element axis, extends continuously along said compressible elastic member between said first and second spaced locations, and applies a compressive force to pre-load said compressible elastic member, wherein each of said individual compression elements is flexible in at least one direction other than the direction of said compressive force and applies said compressive force in the direction of said elastic element axis, at least a portion of each of said individual compression elements being spaced from the other of said individual compression elements in a direction transverse to said elastic element axis, further comprising two flanges, each of said two flanges being attached to said compressible elastic member at a respective one of said first and second locations and each of said individual compression elements is connected to said two flanges.

2. A vibration-reducing component according to claim 1 wherein said compressible elastic member is polyurethane.

3. A vibration-reducing element according to claim 2 wherein said polyurethane is 95A durometer.

4. A vibration-reducing component according to claim 1 wherein said plurality of individual compression elements comprises two said individual compression elements each of which is on a respective opposite side of said compressible elastic member transverse to said elastic element axis.

5. A vibration-reducing component according to claim 4 wherein said two individual compression elements comprise linear tensioning elements that are coplanar.

6. A vibration-reducing component according to claim 1 wherein said compressible elastic member is tubular.

7. A vibration-reducing component according to claim 1, further comprising a first flange at said first location engaging one end of said compressible elastic member, a second flange at said second location engaging an opposed end of said compressible elastic member, and each of said individual compression elements is connected to said first and second flanges applying said compressive force.

8. A vibration-reducing component according to claim 7 wherein said plurality of individual compression elements comprises first and second spaced cables.

9. A vibration-reducing component according to claim 1 wherein said compressive force alters the stiffness of said vibration-reducing component non-uniformly transverse to said direction of said compressive force.

10. A vibration-reducing component according to claim 1 wherein said compressive force alters the resistance of the vibration-reducing component to external forces applied to the vibration-reducing component.

11. A vibration-reducing component according to claim 1 further comprising a support element that extends from the compressible elastic member to at least at least one of said individual compression elements.

12. Equipment having one or more tools and a handle connected to at least one of said tools at one end and structure for controlling operation of said at least one of said tools by an operator at an opposite end, wherein said handle is connected to said at least one of said tools by a vibration-reducing component of claim 1.

13. Equipment according to claim 12 wherein at least a portion of said handle is elongate in the direction of said elastic element axis.

14. Equipment according to claim 13 wherein said plurality of individual compression elements comprises two individual compression elements on respective opposite sides of said compressible elastic member transverse to said elastic element axis.

15. Equipment according to claim 14 wherein said two individual compression elements comprise linear tensioning elements that are coplanar in a plane that is vertical when said equipment is in use and said compression provides said vibration-reducing component with additional resistance to external forces in said plane.

16. Equipment according to claim 14 further comprising a bearing that allows rotation of said handle with respect to said at least one of said tools.

17. A vibration-reducing component comprising a compressible elastic member and means for placing said compressible elastic member into compression to alter the vibration-reducing properties of the vibration-reducing component.

* * * * *